United States Patent
Matsumoto

(10) Patent No.: US 9,262,417 B2
(45) Date of Patent: Feb. 16, 2016

(54) DOCUMENT MANAGEMENT SERVER AND DOCUMENT MANAGEMENT METHOD

(71) Applicant: CANON KABUSHIKI KAISHA, Tokyo (JP)

(72) Inventor: Yoshitaka Matsumoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 106 days.

(21) Appl. No.: 13/752,933

(22) Filed: Jan. 29, 2013

(65) Prior Publication Data

US 2013/0198143 A1    Aug. 1, 2013

(30) Foreign Application Priority Data

Jan. 31, 2012    (JP) ................................. 2012-018415

(51) Int. Cl.
*G06F 17/30* (2006.01)

(52) U.S. Cl.
CPC .... *G06F 17/30011* (2013.01); *G06F 17/30902* (2013.01)

(58) Field of Classification Search
None
See application file for complete search history.

(56) References Cited

U.S. PATENT DOCUMENTS

| | | | | |
|---|---|---|---|---|
| 2004/0098379 A1* | 5/2004 | Huang | | 707/3 |
| 2004/0107085 A1* | 6/2004 | Moosburger et al. | | 703/13 |
| 2008/0086540 A1* | 4/2008 | Scott et al. | | 709/217 |
| 2009/0106363 A1* | 4/2009 | Fallen et al. | | 709/204 |
| 2011/0285715 A1* | 11/2011 | Li et al. | | 345/428 |
| 2013/0067237 A1* | 3/2013 | Huang et al. | | 713/189 |

FOREIGN PATENT DOCUMENTS

| | | |
|---|---|---|
| CN | 102255930 A | 11/2011 |
| JP | H10042125 A | 2/1998 |
| JP | 2005092282 A | 4/2005 |
| JP | 2005157956 A | 6/2005 |
| JP | 2006-126962 A | 5/2006 |
| JP | 2006338669 A | 12/2006 |
| WO | 2008/029774 A1 | 3/2008 |
| WO | 2008084738 A1 | 7/2008 |

OTHER PUBLICATIONS

Wikipedia, WAR (file format), http://en.wikipedia.org/w/index/pho?title=WAR(file_format)&ol . . . , Dec. 18, 2011, pp. 1-3.
c.bavota, How to Upload and Unpack a Zip File using PHP, Aug. 14, 2011, http://bavotasan.com/2010/how-to-upload-zip-file-using-php/, pp. 1-10.
WinZip, http://www.winzip.de/help/help_jobsoptions.htm?, Nov. 4, 2011, pp. 1-2.
ZipCart, http://drupal.org/project/zipcart. Jan. 6, 2012, pp. 1.

* cited by examiner (Continued)

Primary Examiner — Kimberly Wilson
Assistant Examiner — Hau H Hoang
(74) Attorney, Agent, or Firm — Canon USA, Inc., IP Division

(57) ABSTRACT

A document management server according to the present invention acquires entity data of a plurality of content documents specified to be downloaded by the client, and stores the acquired entity data of each of the plurality of content documents in a different folder generated in an archive file when there are content documents having a same name among the specified plurality of content documents. Further, the document management server generates an information file in which path information in the document management server and path information in the archive file with respect to each of the plurality of content documents specified to be downloaded are described in association with the corresponding content document, and stores the generated information file in the archive file. Further, the document management server transmits the archive file storing the entity data of each of the plurality of content documents and the information file to the client.

9 Claims, 20 Drawing Sheets

FIG.5A
UI SCREEN

| SEARCH SCOPE: | /TOP FOLDER | 520 |
| KEYWORD | ESTIMATE FORM | 521 |

522 — SEARCH

| NAME | LOCATION |
|---|---|
| 411 — ESTIMATE FORM | /TOP FOLDER/20111101 |
| 421 — ESTIMATE FORM | /TOP FOLDER/20111102 |
| 431 — ESTIMATE FORM | /TOP FOLDER/20111103 |

FIG.5B
SELECTION OF CONTENT DOCUMENT 503

| NAME | LOCATION |
|---|---|
| 411 — ESTIMATE FORM | /TOP FOLDER/20111101 |
| 421 — ESTIMATE FORM | /TOP FOLDER/20111102 — 530 |
| 431 — ESTIMATE FORM ▶ | /TOP FOLDER/20111103 — 531 |

532

FIG.5C
DISPLAY OF CONTEXT MENU 503

| NAME | LOCATION |
|---|---|
| ESTIMATE FORM | /TOP FOLDER/20111101 |
| ESTIMATE FORM | /TOP FOLDER/20111102 |
| ESTIMATE FORM ▶ | DOWNLOAD |

COPY — 541
DELETE
RENAME — 540

532

FIG.6A
ARCHIVE FILE 600

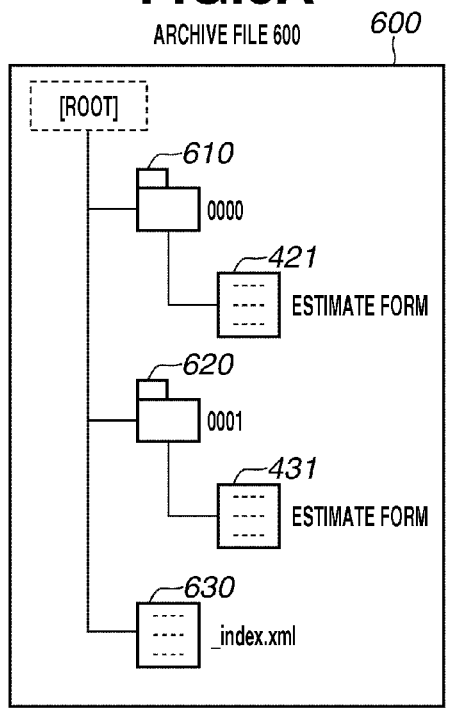

FIG.6B
ARCHIVE INFORMATION FILE 630

```
<?xml version="1.0" encoding="UTF-8"?>
640 — <result_list>
650 —   <result>
          <name>ESTIMATE FORM</name>
          <path>http://Server/TOP FOLDER/20111102</path>
          <vpath>./0000/ESTIMATE FORM</vpath>
660 —     <properties>····</properties>
        </result>
670 —   <result>
          <name>ESTIMATE FORM</name>
          <path>http://Server/TOP FOLDER/20111103</path>
          <vpath>./0001/STIMATE FORM</vpath>
680 —     <properties>····</properties>
        </result>
        </result_list>
```

FIG.6C
DETAILS OF PROPERTY INFORMATION 660

```
<properties>
661 — <property>
        <name>STORE</name>
        <value>KYOTO</value>
      </property>
662 — <property>
        <name>DELIVERY DATE</name>
        <value>DECEMBER 2, 2011</value>
      </property>
</properties>
```

FIG.6D
DETAILS OF PROPERTY INFORMATION 680

```
<properties>
681 — <property>
        <name>STORE</name>
        <value>FUKUOKA</value>
      </property>
682 — <property>
        <name>DELIVERY DATE</name>
        <value>DECEMBER 3, 2011</value>
      </property>
</properties>
```

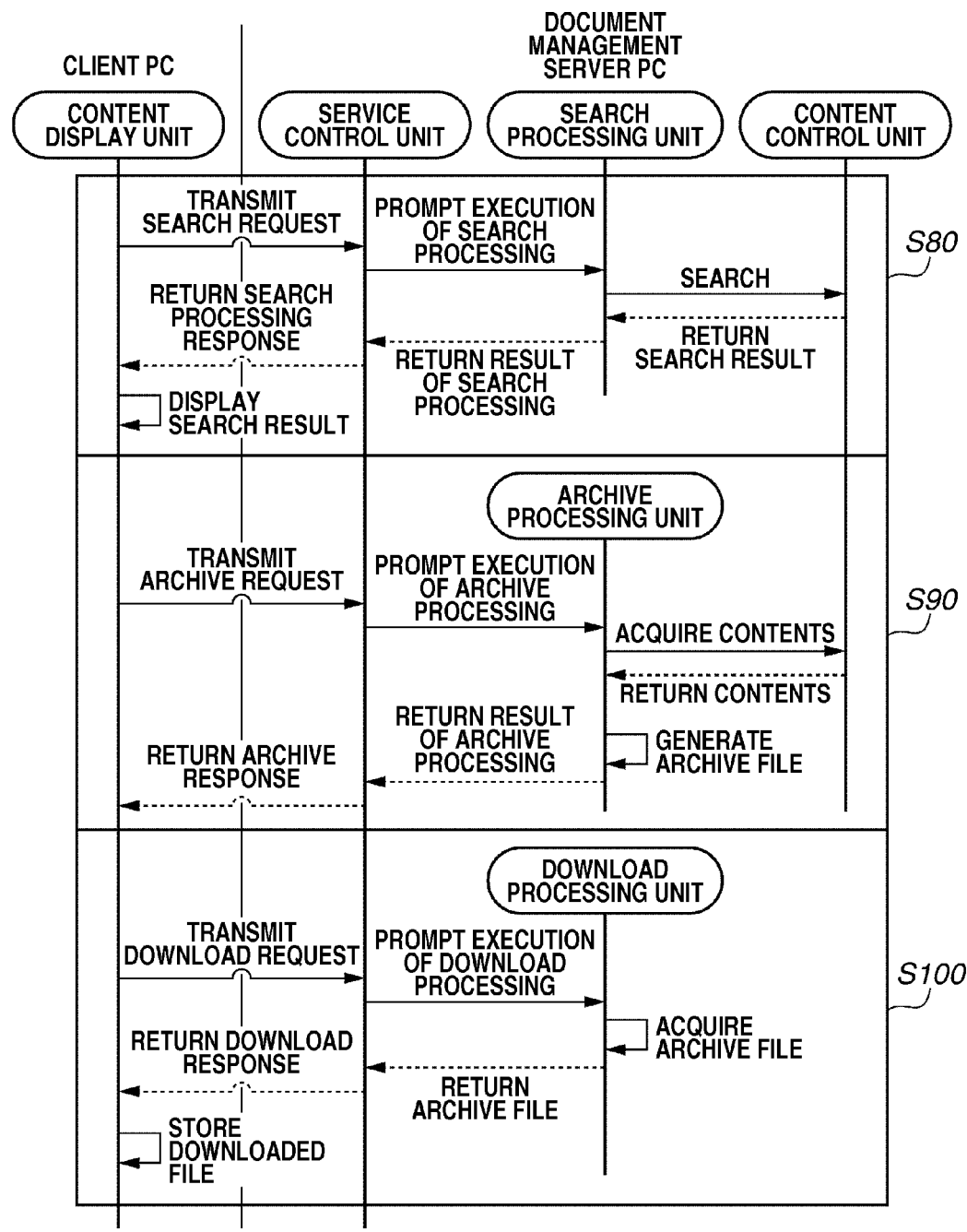

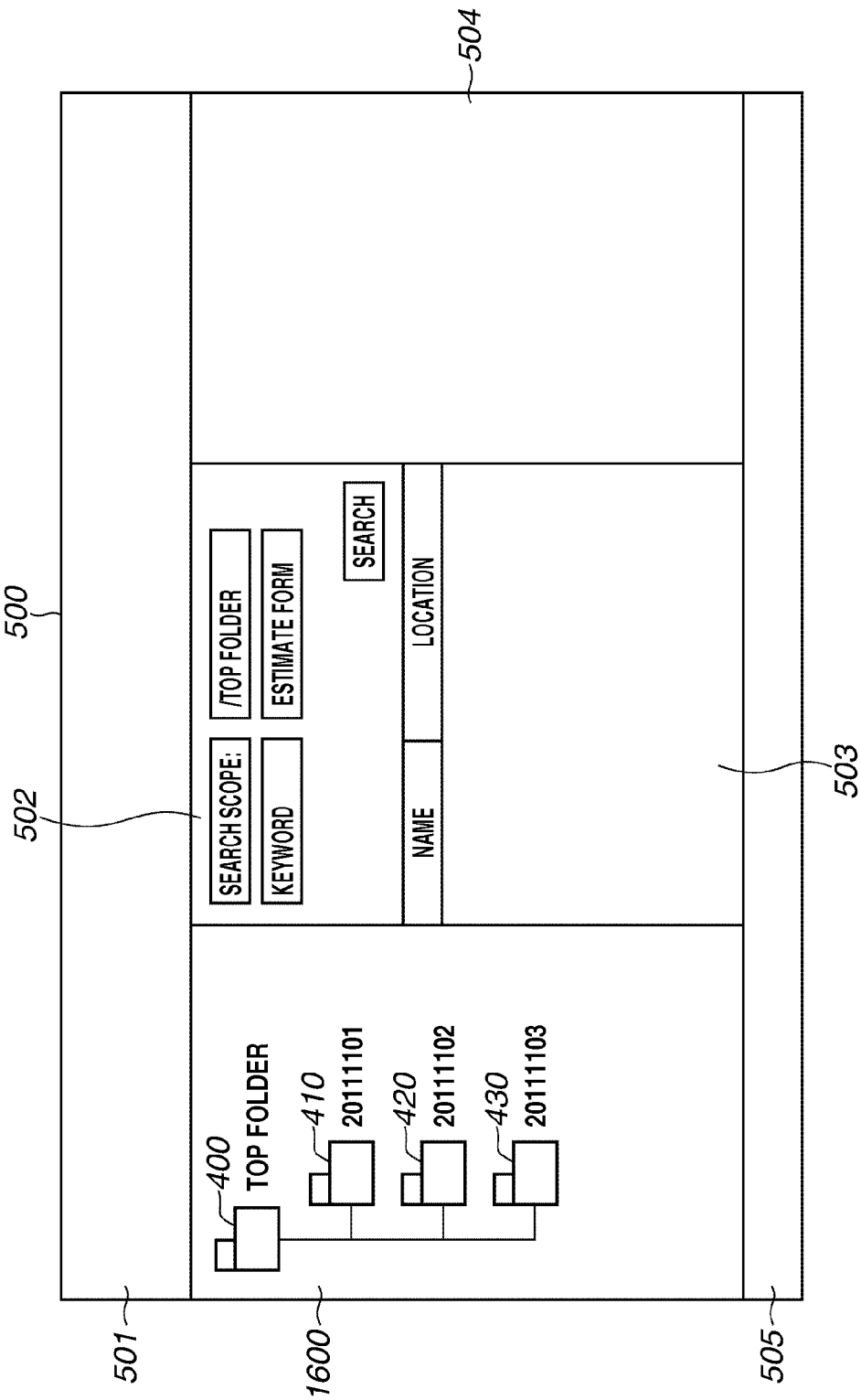

FIG. 17A
ARCHIVE FILE 1700

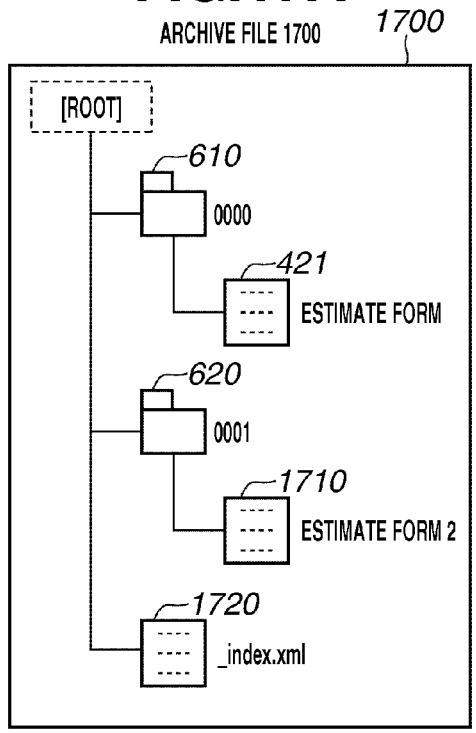

FIG. 17B
ARCHIVE INFORMATION FILE 1720

```
<?xml version="1.0" encoding="UTF-8"?>
640 — <result_list>
650 — <result>
        <name>ESTIMATE FORM</name>
        <path>http://Server/TOP FOLDER/20111102</path>
        <vpath>./0000/ESTIMATE FORM</vpath>
1730 — <properties>····</properties>
      </result>
670 — <result>
1740 — <name>ESTIMATE FORM 2</name>
        <path>http://Server/TOP FOLDER/20111103</path>
        <vpath>./0000/STIMATE FORM</vpath>
680 — <properties>····</properties>
      </result>
      </result_list>
```

FIG. 17C
DETAILS OF PROPERTY INFORMATION 1730

```
      <properties>
661 — <property>
        <name>STORE</name>
        <value>KYOTO</value>
      </property>
662 — <property>
        <name>DELIVERY DATE</name>
1731 — <value>DECEMBER 12, 2011</value>
      </property>
      </properties>
```

FIG. 17D
DETAILS OF PROPERTY INFORMATION 680

```
      <properties>
681 — <property>
        <name>STORE</name>
        <value>FUKUOKA</value>
      </property>
682 — <property>
        <name>DELIVERY DATE</name>
        <value>DECEMBER 3, 2011</value>
      </property>
      </properties>
```

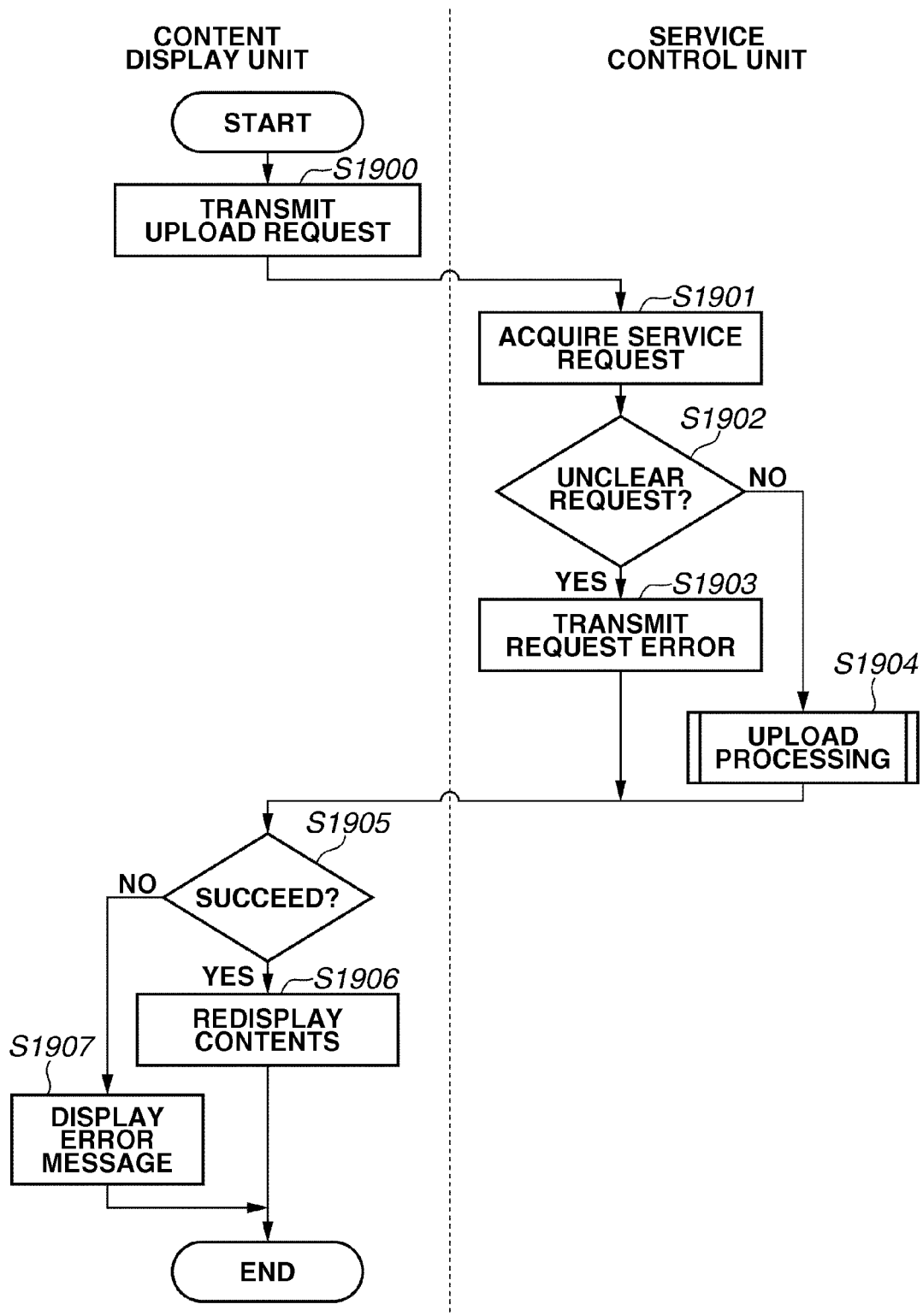

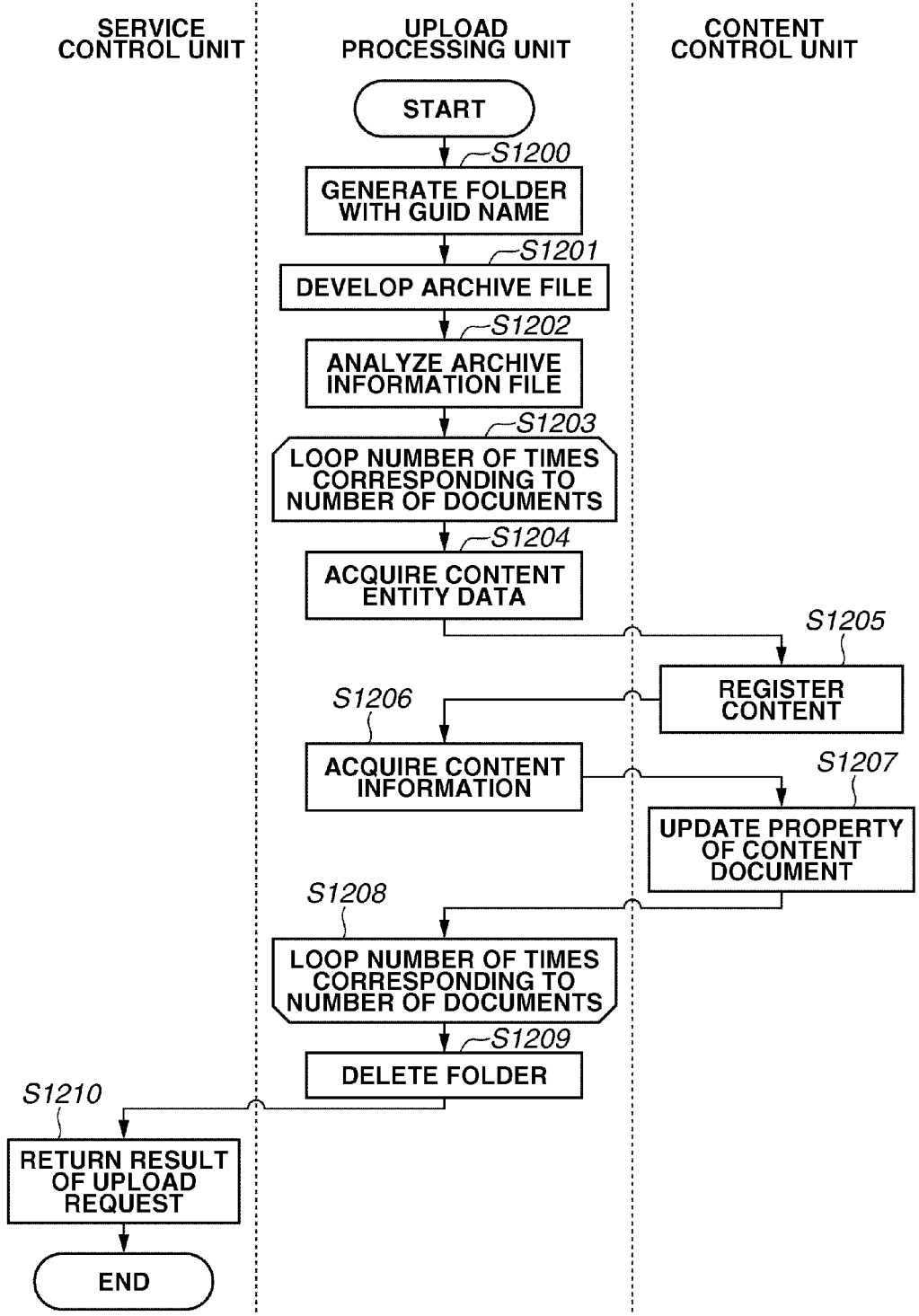

DOCUMENT MANAGEMENT SERVER AND DOCUMENT MANAGEMENT METHOD

BACKGROUND OF THE INVENTION

1. Field of the Invention

The present invention relates to a document management server configured to manage documents, and a document management method thereof.

2. Description of the Related Art

In a conventional document management system that works on a web browser, a user can, for example, display, search for, and download folders and documents managed by a document management server, and upload documents and files to the document management server. Further, the document management system may have a function of allowing a user to archive a plurality of documents into a single file and then download them when collectively downloading the plurality of documents. For example, the user can download a plurality of files after putting them together into a single ZIP file by archiving them in the ZIP format.

Further, WO2008/029774 discusses a system allowing a user to drag and drop an object (an icon or a link) defined in HyperText Markup Language (HTML) onto an operating system (OS) of a local personal computer (PC) to easily download a file associated with the object.

Further, Japanese Patent Application Laid-Open No. 2006-126962 discusses a system in which, when a user edits a downloaded document and stores it, if there is another document that the user refers to, the user can store the document while embedding a full path of the document referred to therein, and view the document referred to previously from the full path embedded in the document when reopening the document.

A search for a document managed by the document management server may result in a discovery of a plurality of documents stored in a plurality of different storage locations (different directories and folders). At this time, identically named documents stored in different locations may be acquired as a search result. A standard client PC does not allow a user to store documents having a same name into a same folder as a download destination. Therefore, every time a user downloads each document having a same name, the user has to bother to rename the document or specify a folder into which the document is stored. Accordingly, the conventional document management system has such a problem that a user may have to perform a cumbersome operation to download a plurality of documents.

SUMMARY OF THE INVENTION

According to an aspect of the present invention, a document management server is connected to a client via a network and is configured to manage content documents stored in a folder having a hierarchical structure. The document management server includes an entity data storage unit configured to acquire entity data of a plurality of content documents specified to be downloaded by the client, and store the acquired entity data of each of the plurality of content documents in a different folder generated in an archive file in a case where there are content documents having a same name among the specified plurality of content documents, an archive information file storage unit configured to generate an information file in which path information in the document management server and path information in the archive file with respect to each of the plurality of content documents specified to be downloaded are described in association with each other, and store the generated information file in the archive file, and a transmission unit configured to transmit the archive file storing the entity data of each of the plurality of content documents and the information file to the client.

If there are document files having a same name when a user collectively downloads a plurality of document files (a plurality of content documents), a plurality of folders are automatically generated, and the respective documents are stored in the folders, so that the user can collectively download the plurality of documents without changing the names of the respective document files.

Further, when a user downloads documents, an information file, in which information pieces (for example, paths and properties) regarding the respective document files are described together, is generated and stored, so that the user can even find a location from where the respective document files are downloaded.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 5A, 5B, and 5C illustrate an example of a configuration of a user interface (UI) screen according to the first exemplary embodiment.

FIGS. 6A, 6B, 6C, and 6D illustrate an example of a configuration of an archive file according to the first exemplary embodiment.

FIG. 7 illustrates a sequence of processing for downloading a plurality of contents.

FIG. 16 illustrates an example of a configuration of a UI screen according to the second exemplary embodiment.

FIGS. 17A, 17B, 17C, and 17D illustrate an example of a configuration of an archive file to be uploaded.

FIG. 19 is a flowchart of transmission of an upload request.

FIG. 20 is a flowchart of upload processing.

DESCRIPTION OF THE EMBODIMENTS

Various exemplary embodiments, features, and aspects of the invention will be described in detail below with reference to the drawings.

<System Configuration>

Figure 1:
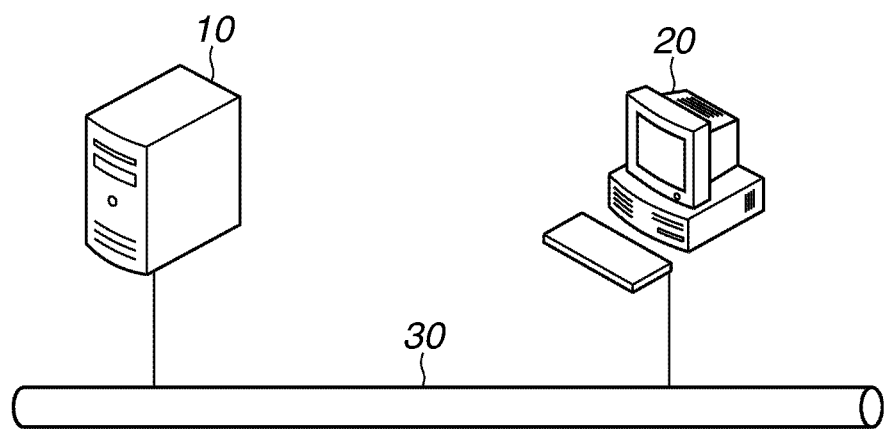
FIG. 1 illustrates a system configuration.

FIG. 1 illustrates a configuration of a document management system according to an exemplary embodiment of the present invention. This system includes a document management server personal computer (PC) 10 and a client PC 20 connected to each other via a network such as a local area network (LAN) 30. The document management server PC 10 is a server that provides a document management function of managing contents (files) such as documents and images, and a Web application server function. The client PC 20 provides a function of connecting to the document management server PC 10 via a web browser and manipulating the contents. The document management server PC 10 and the client PC 20 each can be constituted by hardware of a commonly used information processing apparatus (PC).

Figure 2:
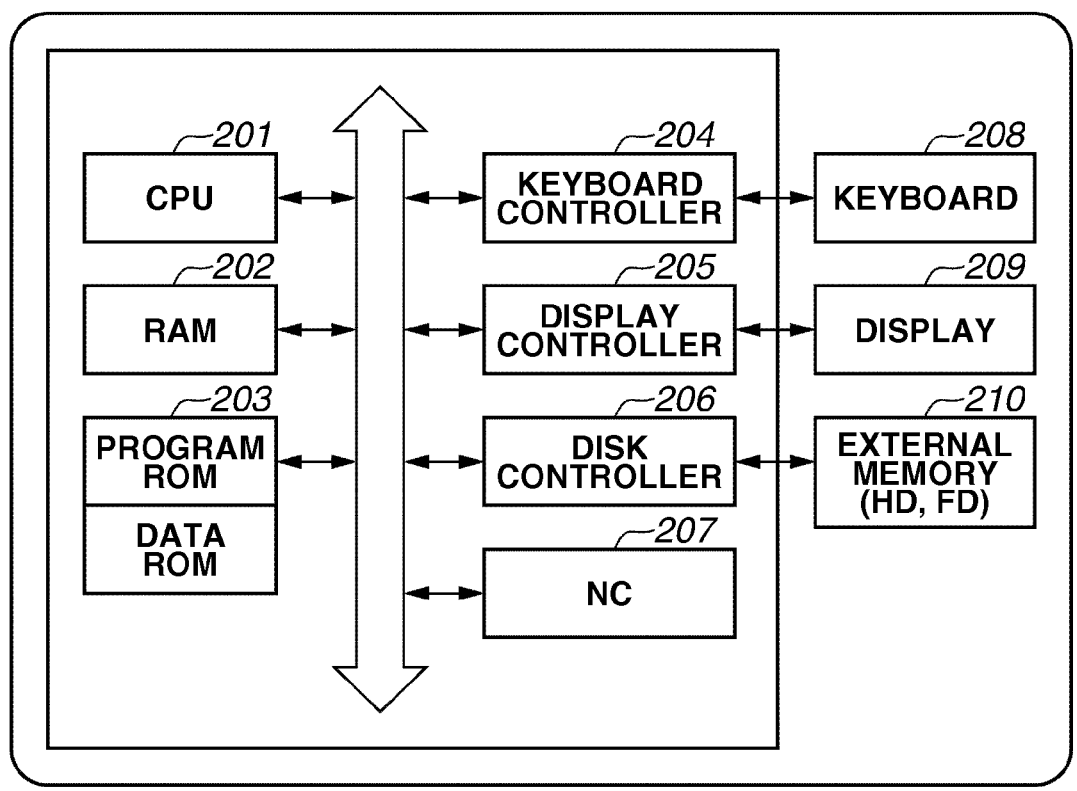
FIG. 2 illustrates a hardware configuration of a document management server and a document management client.

FIG. 2 illustrates a hardware configuration of each PC included in the document management system according to the present exemplary embodiment. Referring to FIG. 2, a central processing unit (CPU) 201 executes a program stored in a program read only memory (ROM) in a ROM 203, and a program such as an operating system (OS) and an application loaded from a hard disk 210 to a random access memory (RAM) 202. In other words, the computer (CPU) functions as respective processing units configured to perform processing of respective flowcharts that will be described below, by executing the program stored in a computer readable storage medium.

The RAM 202 is a main memory of the CPU 201, and functions as, for example, a work area. A keyboard controller 204 controls an operation input from a keyboard 208 and a not-illustrated pointing device (for example, a mouse, a touch pad, a touch panel, and a trackball). A display controller 205 controls a display of a display device 209. A disk controller 206 controls data access to the external memory 210 such as a hard disk (HD) or a flexible disk (FD) storing various kinds of data. A network controller (NC) 207 is connected to the network, and controls communication between the present PC and another apparatus connected to the network.

Figure 3:
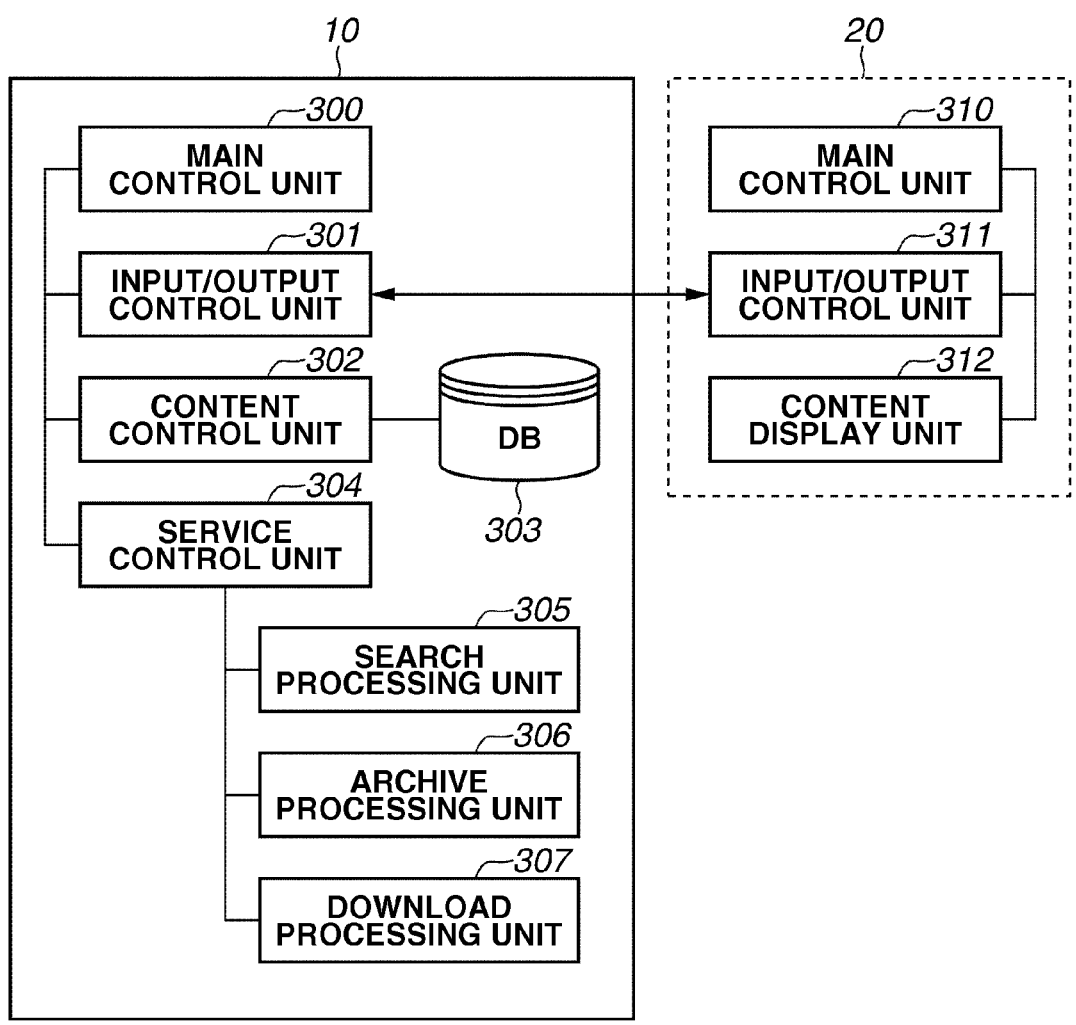
FIG. 3 illustrates an example of a configuration of respective processing units according to a first exemplary embodiment.

In the following description, a flow of processing of a system according to a first exemplary embodiment of the present invention will be described. FIG. 3 illustrates an example of a configuration of respective processing units provided by the document management server PC 10 and the client PC 20 in the system according to the first exemplary embodiment of the present invention. The CPU 201 of the document management server PC 10 executes the program, by which the document management server functions as respective processing units 300 to 307. Information such as contents is stored in the external memory 210, and is loaded to the RAM 201 to be processed when necessary.

A main control unit 300 of the document management server PC 10 performs main control processing for controlling an application of the document management server. Further, the main control unit 300 controls an input/output control unit 301, a content control unit 302, and a service control unit 304, and mediates, for example, folder information, content information (information regarding, for example, a name and a storage location of a content), and content entity data (a document file that is an entity of a content document).

The input/output control unit 301 receives a service request from the client PC 20, and transmits a response thereto to the client PC 20. The content control unit 302 acquires content information and content entity data from a database (DB) 303 according to a request from the client PC 20. Content information and content entity data may be managed with use of, for example, a DB or a management file, and may be managed in any manner.

The service control unit 304 assigns processing to a search processing unit 305, an archive processing unit 306, or a download processing unit 307 according to a service request received by the input/output management unit 301. After receiving a result of the processing from the corresponding processing unit, the service control unit 304 transfers the result to the input/output management unit 301. The search processing unit 305 analyzes search parameters (a search scope and a search condition) of a search request, and acquires content information which meets the search conditions from the DB 303. The search processing unit 305 transfers the acquired content information to the service control unit 304 as result data.

The archive processing unit 306 stores content entity data corresponding to content information specified by a parameter in an archive request, and a content information file thereof together in an archive file (for example, a ZIP file). The archive processing unit 306 transfers a file identifier (referred to as a "globally unique identifier (GUID)" in the present exemplary embodiment) for identifying the archived archive file for each archive request to the service control unit 304 as result data. The download processing unit 307 transfers a ZIP file corresponding to an archive file identifier (a GUID acquired from an archive request) specified by a parameter in a download request to the service control unit 304 as result data.

Further, the CPU 201 of the client PC 20 reads out the program of the respective processing units and executes it, by which the client PC 20 functions as the respective processing units 310 to 312. A main control unit 310 of the client PC 20 performs main control processing for controlling an application of the client PC 20. Further, the main control unit 310 controls an input/output management unit 311 and a content display unit 312, and mediates, for example, content information and content entity data. The input/output management unit 311 transmits a service request to the document management server PC 10, and receives a response from the document management server PC 10. The content display unit 312 analyzes content information received from the document management server PC 10 and displays it on a web browser.

Figure 4:
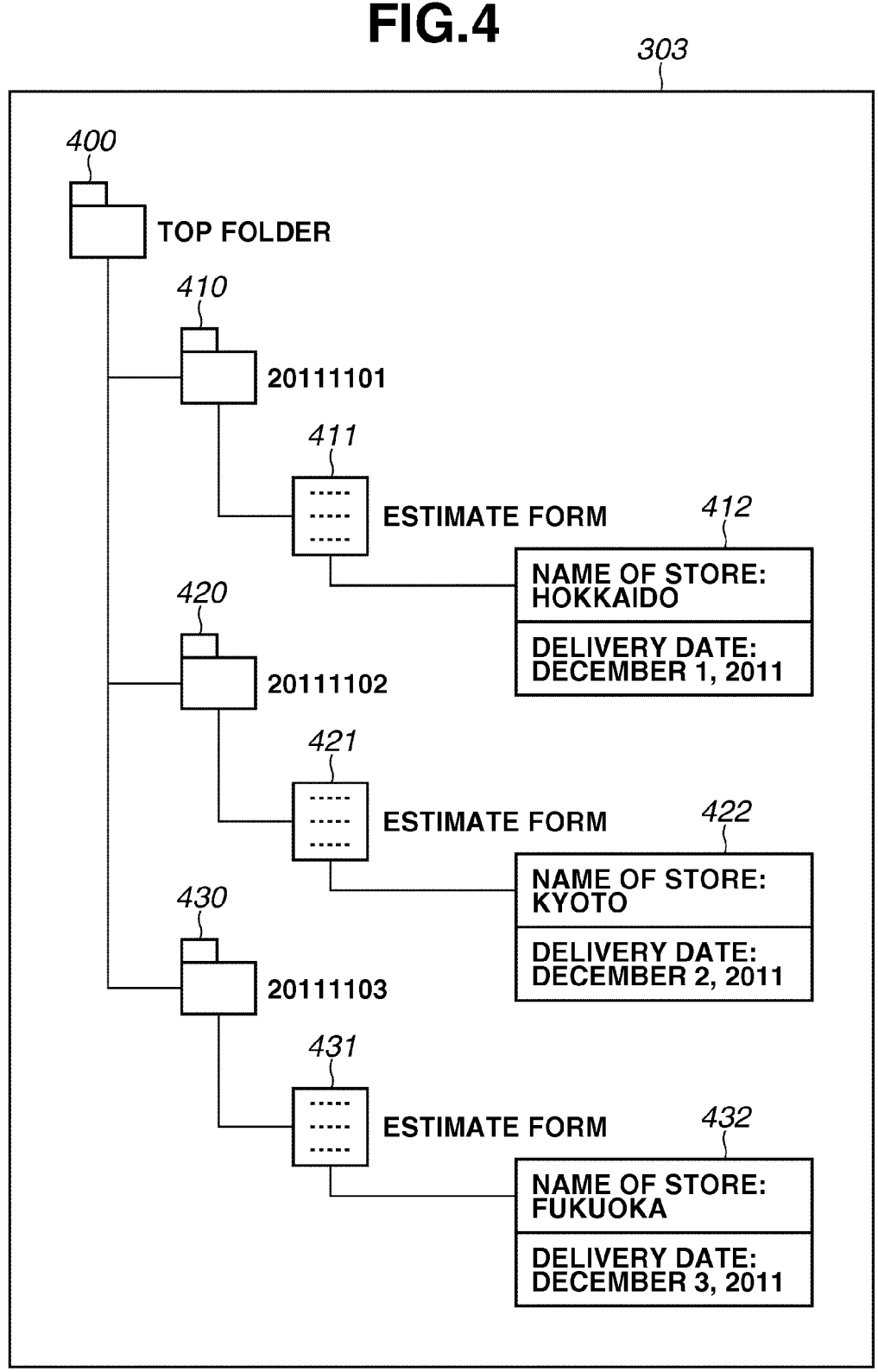
FIG. 4 illustrates an example of a configuration of contents.

FIG. 4 illustrates an example of a configuration of contents stored in the DB 303 according to the first exemplary embodiment. The term "content" refers to a document file (hereinafter referred to as a "content document") such as a document and an image, and a folder storing a document file. A folder has a hierarchical structure, and a sub folder and a content document can be managed within each folder. Further, a content document holds a content document property, which is an additive attribute, associated with the content document.

A top folder 400 is a top-level folder that unifies all contents. In an example illustrated in FIG. 4, a 20111101 folder (hereinafter referred to as "the folder 410"), a 20111102 folder (hereinafter referred to as "the folder 420"), and a 20111103 folder (hereinafter referred to as "the folder 430") are managed under the top folder 400. An estimate form 411 (hereinafter referred to as "the content document 411"), which is a content document, is stored in the folder 410. Further, the content document 411 has content document properties 412. An estimate form 421 (hereinafter referred to as "the content document 421"), which is a content document, is stored in the folder 420. The content document 421 has content document properties 422. An estimate form 431 (hereinafter referred to as "the content document 431"), which is a content document, is stored in the folder 430. The content document 431 has content document properties 432.

FIG. 5 illustrates an example of a configuration of a user interface screen (a UI screen) according to the first exemplary embodiment, and the UI screen is displayed by the content display unit 312. A main screen 500 includes a header display area 501, a search condition area 502, a content display area 503, a property display area 504, and a footer display area 505. FIG. 5A illustrates an example of a configuration of the entire UI screen. FIG. 5B is an enlarged view of the content display area 503 when content documents are selected. FIG. 5C is an enlarged view of the content display area 503 when a context menu is displayed.

A name of an application, a menu, and the like are displayed in the header display area 501. Further, a text input area, where a user sets and inputs conditions for searching for content documents managed in the DB 303, is displayed in the search condition area 502. In the present exemplary embodiment, the search condition area 502 includes an input area 520 for setting a search scope, a search keyword input area 521 for setting a search keyword, and a search button 522 for starting search processing. The content display unit 312 receives an instruction for search execution according to pressing of the search button 522, and then transmits a search request to the document management server PC 10, specifying a text input in the search scope input area 520 and a text input in the search keyword input area 521 as parameters.

A content document determined to meet the search conditions set in the search condition area 502 (i.e., a search result) is displayed in the content display area 503. In the example illustrated in FIG. 5A, a search is conducted with "TOP FOLDER" (400) and "ESTIMATE FORM" set as the search scope and the keyword, respectively. As a result of the search, it is determined that content documents (411, 421, and 431), which include the term "ESTIMATE FORM" in the names of the content documents, meet the search conditions, and these content documents are displayed in the content display area 503 in the form of a list.

A content document desired by a user can be selected from the content documents displayed in the form of a list according to a user's instruction. For example, in a case where the content documents 421 and 431 are selected by a user, as illustrated in FIG. 5B, the content display unit 312 displays the content documents 421 and 431 while highlighting them in selected states 530 and 531.

At this time, when a mouse cursor is placed over the content document in the selected state by a user's mouse operation, the content display unit 312 displays a context menu button 532 for displaying a context menu. Then, when the context menu button 532 is clicked by a user's operation, as illustrated in FIG. 5C, the content display unit 312 displays a context menu 540. When a "DOWNLOAD" option 541 in the context menu 540 is specified by the user, the content display unit 312 transmits an archive request to the document management server PC 10 while setting the content documents that are in selected states when the download option is specified (the content documents 421 and 431 in the example illustrated in FIG. 5C) as parameters.

The property display area 504 is an area for, when content data is selected in the content display area 503, displaying properties of the selected content document. The properties displayed here include information indicating, for example, a name of the selected content document, a path of the content document, and an attribute of the content document. Further, the footer display area 505 is an area for displaying a version of the application and copyrights.

FIG. 6A illustrates a configuration of an archive file 600 generated by the document management server PC 10 when download is instructed on the screen illustrated in FIG. 5C. In the present exemplary embodiment, the archive file 600 is generated in the ZIP file format. However, the format of the archive file 600 is not limited to the ZIP format, and may be any other format which can store a plurality of files in a single file. The archive file 600 contains folders 610 and 620, and an archive information file 630. Further, the folder 610 contains entity data of the content document 421, and the folder 620 contains entity data of the content document 431.

Information (a name, a path, and properties) regarding a content document specified by an archive request received from the client PC 20, and a path of the content document in the archive file are described in an archive information file 630. In an example illustrated in FIG. 6B, the archive information file 630 is constructed in Extensible Markup Language (XML), but the format of the archive information file 630 is not limited to XML, and may be another file format such as Comma Separated Values (CSV).

The respective tags defining a data structure of the archive information file 630 will be described using the example illustrated in FIG. 6B. Tags 640 are defined by a pair of <result_list> and </result_list>, and are root tags managing tags 650 and 670.

The tags 650 are defined by a pair of <result> and </result>, and manage information (a name, a path, and a path in the archive file 600, and properties) regarding the content document 421 contained in the archive file 600 by the following tags. The name of the content document 421 is descried between tags <name> and </name>. Further, the path when the content document 421 is managed under management of the document management server is described between tags <path> and </path>. Further, the path where the content document is managed in the archive file is described between tags <vpath> and </vpath>. Further, the property information of the content document 421 is described between tags <properties> and </properties>.

FIG. 6C illustrates the details of property information 660 of the content document 421. Tags 661 and 662, which are each defined by a pair of <property> and </property>, manage properties (a store property and a delivery date property) added to the content document 421 using the following tags, respectively. A name of each property is described between tags <name> and </name>. A value of each property is described between tags <value> and </value>.

The tags 670 are defined by a pair of <result> and </result>, and manage information (a name, a path under management of the document management server, and a path in the archive file 600, and properties) regarding the content document 431 contained in the archive file 600 by the following tags. The configuration of the tags 670 is similar to the configuration of the tags 650.

FIG. 6D illustrates the details of property information 680 of the content document 431. The tags 680 are defined by a pair of <properties> and </properties>, and manage information of each property added to the content document 431. FIG. 6D illustrates that a value "FUKUOKA" is set between tags 681 as a property "STORE", and a value "DECEMBER 3, 2011" is set between tags 682 as a property "DELIVERY DATE". The configuration of the tags 680 is similar to the configuration of tags 660.

In the following description, a processing flow according to the present first exemplary embodiment will be described. FIG. 7 illustrates a sequence indicating a flow from when user's desired content documents (files) is selected from among a list of a search result after a request for search execution is issued, until the selected content documents is downloaded onto the client PC 20. The sequence illustrated in FIG. 7 is constituted by a flow regarding a search for content documents (S80), a flow of processing for archiving the content documents (S90), and a flow of processing for downloading an archive file (S100). The details of the sequence illustrated in FIG. 7 will be described now.

In step S80, first, the content display unit 312 receives a search execution event issued according to pressing of the search button 522. Then, the content display unit 312 transmits a search request to the document management server PC 10, specifying conditions set in the search scope input area 520 and the search keyword input area 521 as parameters. Upon reception of the search request, the service control unit 304 of the document management server PC 10 prompts the search processing unit 305 to perform search processing.

The search processing unit 305 transmits the search conditions (the search scope and the search keyword) included in the search request to the content control unit 302, thereby causing the content control unit 302 to search for documents. Then, the search processing unit 305 acquires content document information from the content control unit 302 as a search result. The content document information is information such as a name of a content document which meets the search conditions, and a path indicating a folder in which the content document is managed. Information pieces regarding a plurality of content documents can be acquired at the same time as the content document information acquired as a search result. The search processing unit 305 transfers the acquired content document information to the service control unit 304 as a result of search processing.

The service control unit 304 transmits a search processing response in which the content document information in the received result of search processing is set as a parameter, to the content display unit 312. The content display unit 312 displays the content document information received as the search processing response on the content display area 503 in the form of a list. The position and the size of this display are defined in the content display unit 312. The position and the size may be defined in any manner, such as defining them as an internal resource or defining them in an external file.

In step S90, first, the content display unit 312 acquires a selection event issued according to selection of the download 541 from the context menu. Then, the content display unit 312 transmits an archive request in which information of the content documents (421 and 431) in the selected states 530 and 531 is specified as a parameter, to the document management server PC 10. Upon reception of the archive request, the service control unit 304 of the document management server PC 10 prompts the archive processing unit 306 to perform archive processing.

The archive processing unit 306 issues an acquisition request to the content control unit 302 based on the information of each content document included in the archive request, and acquires corresponding content document entity data. The archive processing unit 306 generates an archive file by adding the acquired entity data of each content document to the archive file. The archive processing unit 306 associates the archive file with a file identifier (a GUID) for identifying the generated archive file, and transfers the archive file identifier to the service control unit 304 as a result of archive processing. Upon reception of the result of archive processing, the service control unit 304 transmits the GUID to the content display unit 312 of the client PC 20 as a parameter of an archive response.

In step S100, first, the content display unit 312 extracts the GUID included as a parameter of the received archive response, and transmits a download request in which the extracted GUID is set as a parameter, to the document management server PC 10. Upon reception of the download request, the service control unit 304 of the document management server PC 10 prompts the download processing unit 307 to perform download processing.

The download processing unit 307 acquires the archive file corresponding to the GUID included in the download request, and transfers the acquired archive file to the service control unit 304 as a result of download processing. The service control unit 304 transmits the received archive file to the content display unit 312 of the client PC 20 as a parameter of a download response. Upon reception of the download response, the content display unit 312 stores the archive file included in the received download response in the storage device of the client PC 20.

In the following description, the details of the above-described steps, steps 80, S90, and S100 will be described.

Figure 8:
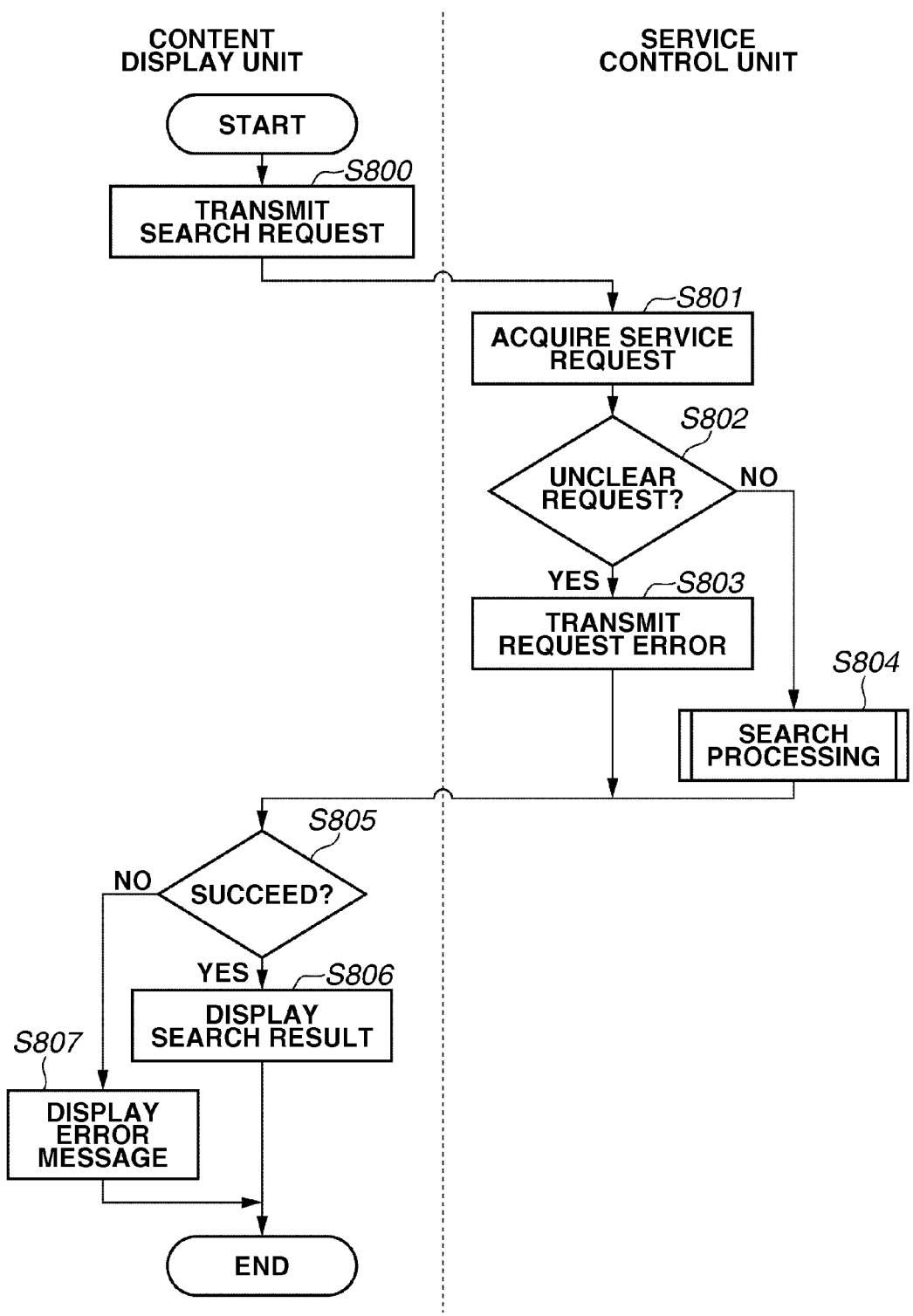
FIG. 8 is a flowchart of transmission of a search request.
Figure 11:
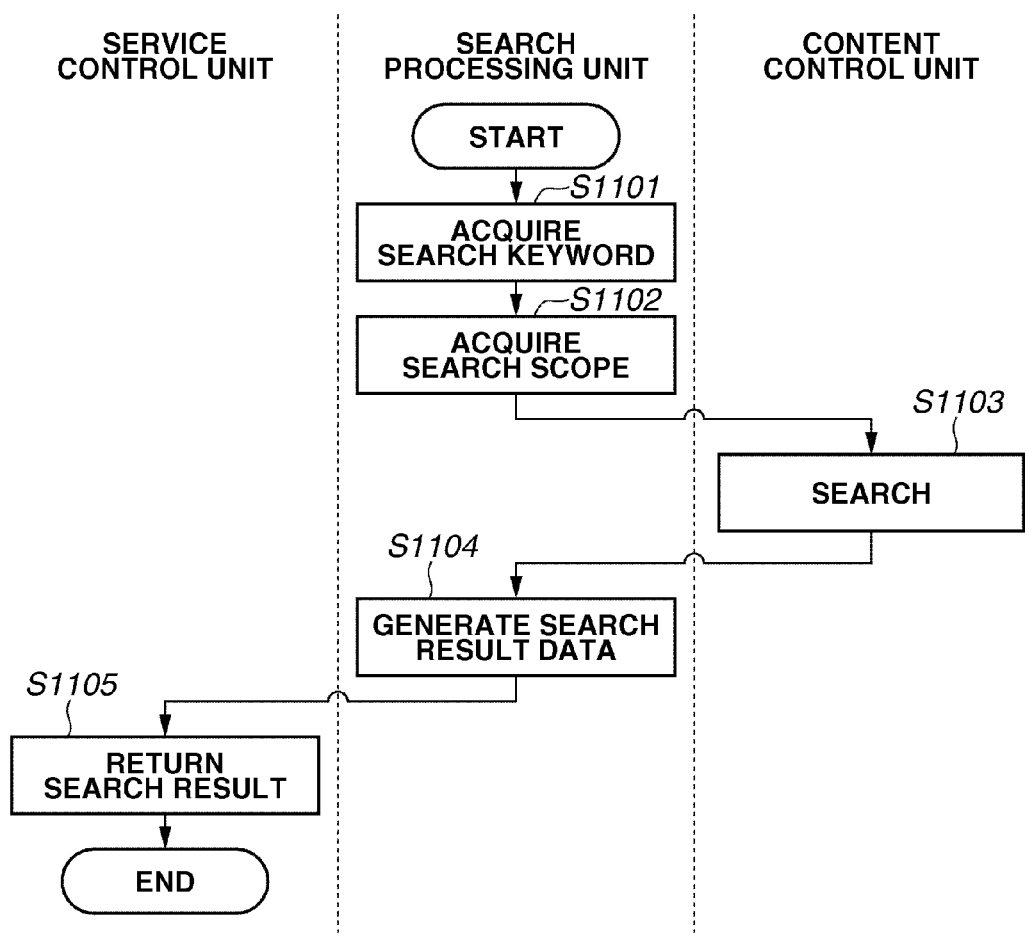
FIG. 11 is a flowchart of search processing.

The details of the content data search processing in step S80 will be described with reference to the flowcharts illustrated in FIGS. 8 and 11. Referring to FIG. 8, in step S800, the content display unit 312 generates a search request, specifying conditions set in the search scope input area 520 and the search keyword input area 521 as parameters upon reception of a search execution event issued according to user's pressing of the search button 522. Then, the content display unit 312 transmits the generated search request to the document management server PC 10.

In step S801, the service control unit 304 of the document management server PC 10 receives the service request, and checks a type of the received request. In step S802, if the service control unit 304 of the document management server PC 10 determines that the type of the received request is unclear (YES in step S802), the processing proceeds to step S803. In step S803, the service control unit 304 transmits a request error to the client PC 20. On the other hand, in step S802, if the service control unit 304 determines that the type of the request is a search request (NO in step S802), the processing proceeds to step S804. In step S804, the service control unit 304 causes the search processing. The details of the search processing will be described below with reference to FIG. 11.

In step S805, the content display unit 312 of the client PC 20 determines whether the search request has succeeded. At this time, the content display unit 312 determines that the search request has succeeded if the content display unit 312 receives a search processing response. In this case (YES in step S805), in step S806, the content display unit 312 extracts content document information from the search processing response, and displays a list of names and paths of content documents in the content display area 503. On the other hand, the content display unit 312 determines that the search request has failed if the content display unit 312 receives an error response. In this case (NO in step S805), in step S807, the content display unit 312 displays an error message.

Next, the details of the search processing in step S804 will be described with reference to FIG. 11. In step S1101, the search processing unit 305 acquires the search key word set in the search keyword input area 521 based on the search request. Further, in step S1102, the search processing unit 305 acquires the search scope set in the search scope input area 520. Then, the search processing unit 305 prompts the content control unit 302 to perform search processing, specifying the acquired keyword and search scope as parameters.

In step S1103, the content control unit 302 acquires information regarding content documents which meet the conditions from the DB 303 based on the search scope and the search keyword received as the search parameters. The content control unit 302 transfers the acquired information regarding the content documents to the search processing unit 305 as a search result.

In step S1104, the search processing unit 305 generates search result data (a search result list) by sequentially addressing the information pieces regarding the content documents transferred as the search result, acquiring the name and the path from each content document information piece, and adding them to the search result data. Then, the search processing unit 305 transfers the generated search result data to the service control unit 304. In step S1105, the service control unit 304 transmits a search processing response in which the search result data is set as a parameter, to the client PC 20.

Figure 9:
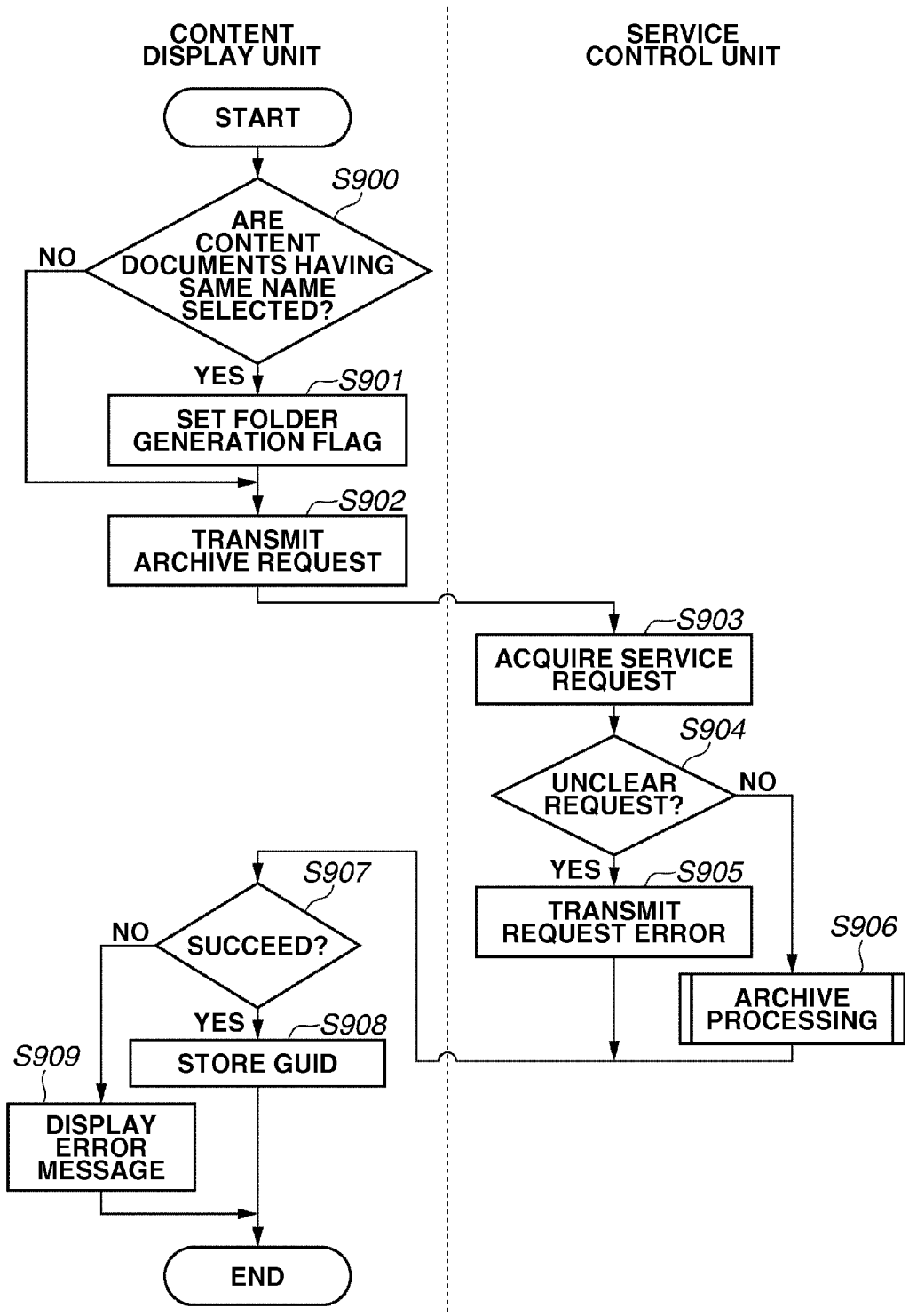
FIG. 9 is a flowchart of transmission of an archive request.
Figure 12:
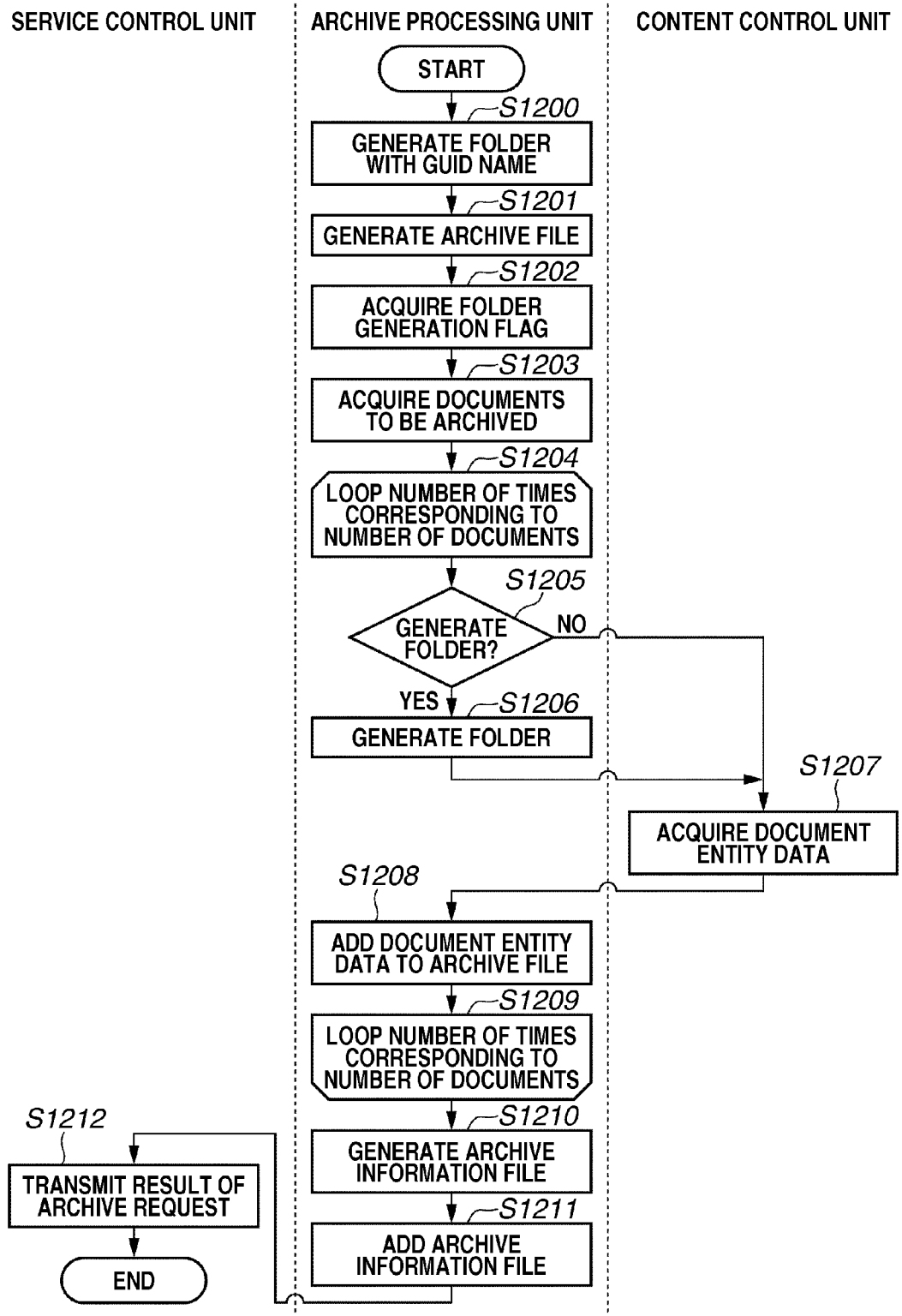
FIG. 12 is a flowchart of archive processing.

The details of the processing for archiving content data in step S90 will be described with reference to the flowcharts illustrated in FIGS. 9 and 12. Referring to FIG. 9, in step S900, the content display unit 312 determines whether a plurality of content documents having a same name is in selected states, upon reception of a selection event issued according to selection of the download option 541 from the context menu. If the content display unit 312 determines that a plurality of content documents having a same name is selected to be downloaded (YES in step S900), in step S901, the content display unit 312 stores a folder generation flag into the RAM 202.

In step S902, the content display unit 302 generates an archive request, specifying information regarding the plurality of content documents (421 and 431) determined to be in selected states, and the folder generation flag set in step S901 as parameters. Then, the content display unit 302 transmits the generated archive request to the document management server PC 10.

In step S903, the service control unit 304 of the document management server PC 10 receives the service request, and checks a type of the received request. In step S904, if the service control unit 304 of the document management server PC 10 determines that the type of the request is unclear (YES in step S904), the processing proceeds to step S905. In step S905, the service control unit 304 transmits a request error to the client PC 20. On the other hand, in step S904, if the service control unit 304 determines that the type of the request is an archive request (NO in step S904), the processing proceeds to step S906. In step S906, the service control unit 304 carries out the archive processing. The details of the archive processing will be described below with reference to FIG. 12.

In step 907, the content display unit 312 of the client PC 20 determines whether the archive request has succeeded. At this time, the content display unit 312 determines that the archive request has succeeded if the content display unit 312 receives an archive response. In this case (YES in step S907), in step S908, the content display unit 312 extracts a GUID from the archive response, and stores the extracted GUID into the RAM 202. On the other hand, the content display unit 312 determines that the archive request has failed if the content display unit 312 receives an error response. In this case (NO in step S907), in step S909, the content display unit 312 displays an error message.

Next, the details of the archive processing in step S906 will be described with reference to FIG. 12. In step S1200, the archive processing unit 306 generates a GUID for identifying an archive file to be generated for the archive request. Further, the archive processing unit 306 generates a folder with the generated GUID name, treating the generated GUID as a character string. The GUID may be any value unique in the document management system, and may be generated by any method. Further, a storage location of the generated folder may be any arbitrary location. For example, it may be convenient to generate the folder in a predetermined storage location in the document management system.

In step S1201, the archive processing unit 306 generates an archive file (the archive file 600 in the example illustrated in FIG. 6A) for storing content document entity data. The character string of the GUID acquired in step S1200 is set to the name of the archive file to be generated. In the present exemplary embodiment, the generated archive file is stored directly under the folder with a GUID name, which is generated in step S1200.

In step S1202, the archive processing unit 306 extracts the folder generation flag set as the parameter from the archive request. In step S1203, the archive processing unit 306 extracts the information regarding the content documents to be archived, which is set as the parameter, from the archive request. Step S1204 is a step where a loop starts. The archive processing unit 306 repeats the processes of steps S1204 to S1209, sequentially processing the information pieces regarding the content documents to be archived. In other words, the steps are repeated according to the number of content documents to be archived.

In step S1205, if the archive processing unit 306 determines that the folder generation flag extracted in step S1202 is set to ON (YES in step S1205), the processing proceeds to step S1206. In step S1206, the archive processing unit 306 generates a new folder for storing the entity data of the content document directly under a root in the archive file. In other words, if the archive processing unit 306 determines that content documents having a same name are selected (YES in step S1205), the archive processing unit 306 generates a new folder (the folders 610 and 620 in the example illustrated in FIG. 6A) to store the content documents under folders having different names. On the other hand, in step S1205, if the archive processing unit 306 determines that the folder generation flag is set to OFF (i.e., folders do not have to be generated) (NO in step S1205), the processing proceeds to step S1207.

In step S1207, the archive processing unit 306 instructs the content control unit 302 to acquire the content document information and the content document entity data. The content control unit 302 acquires the content document information and the content document entity data from the DB 303, and transfers them to the archive processing unit 306.

In step S1208, the archive processing unit 306 additionally stores the acquired content document entity data into the archive file. At this time, in a case where a folder is generated under the root in the archive file in step S1206, the archive processing unit 306 stores the content document entity data directly under the generated folder. On the other hand, in a case where no folder is generated in step S1206, the archive processing unit 306 stores the content document entity data directly under the root in the archive file (i.e., in the root folder). Further, the archive processing unit 306 temporarily stores the content document information (the name, the path, and the properties) acquired in step S1207, and the information of the path where the content document entity data is stored within the archive file, in the memory in a list format.

The step S1209 is a step that makes a pair with step S1204, and a step where the loop ends. In step S1210, the archive processing unit 306 generates the archive information file 630 based on the content information and the information of the path in the archive file, which are temporarily stored in the memory in step S1208. Then, in step S1211, the archive processing unit 306 additionally stores the archive information file 630 generated in step S1210 under the root of the archive file 600 generated in step S1201. The archive processing unit 306 transfers the character string of the GUID generated in step S1200 to the service control unit 304 as a result of archive processing. In step S1212, the service control unit 304 sets the GUID as a parameter of an archive response, and transmits the archive response to the client PC 20.

In the example described above with reference to FIG. 12, the archive processing unit 306 generates a folder in advance in step S1206, and then stores the content document entity data acquired in step S1207 into the archive file in step S1208. However, the order of the steps is not limited thereto. For example, the order of the steps may be changed in such a manner that the archive processing unit 306 first acquires the content document entity data, and then generates a folder when storing the entity data into the archive file.

Figure 10:
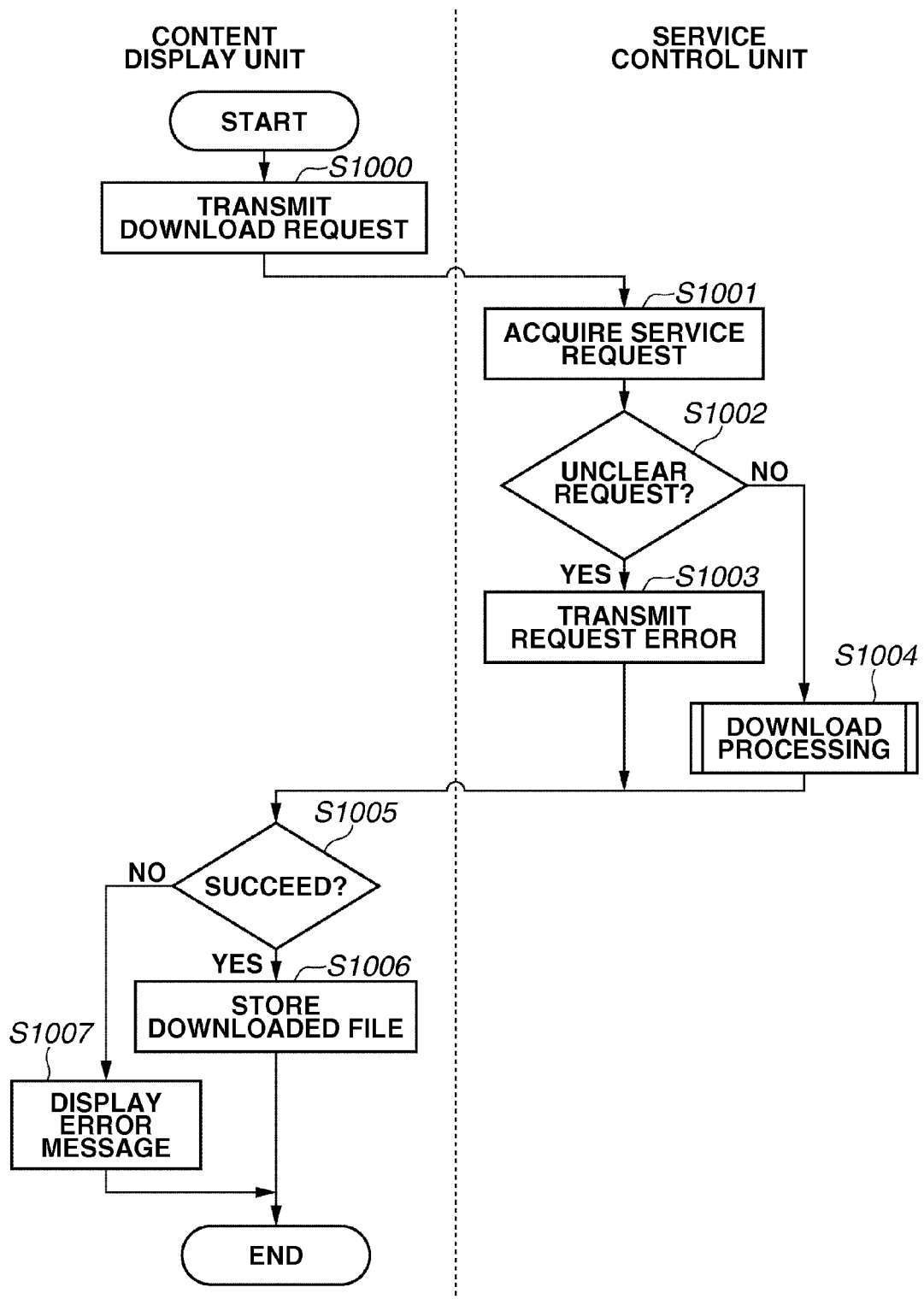
FIG. 10 is a flowchart of transmission of a download request.
Figure 13:
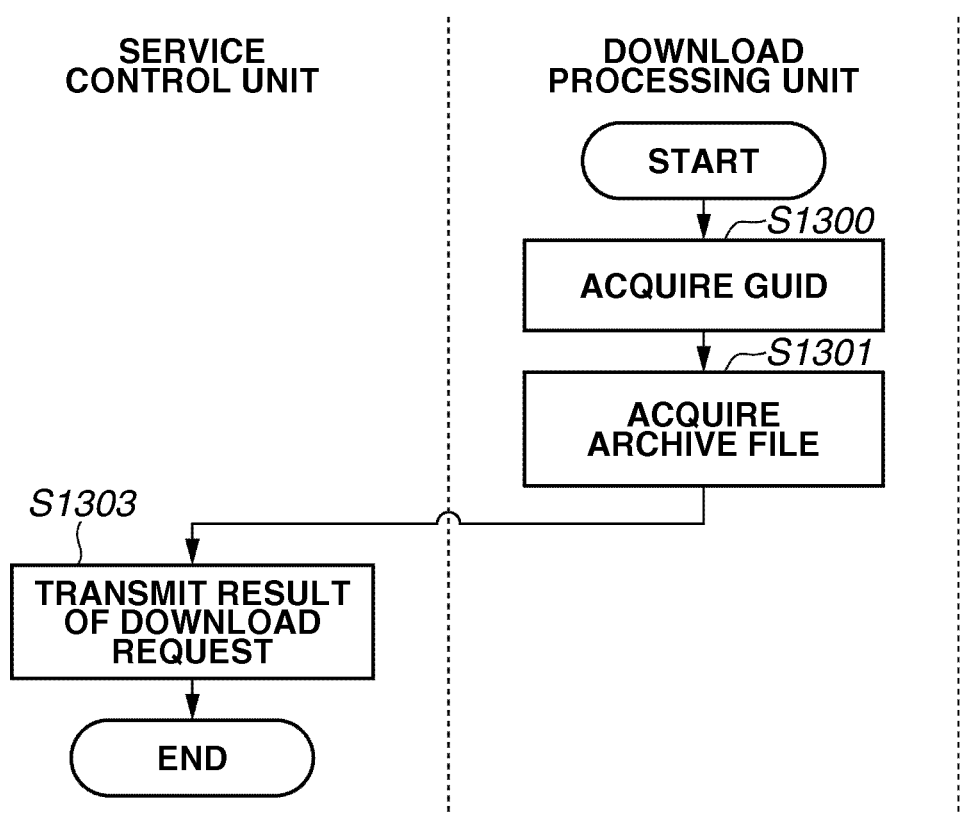
FIG. 13 is a flowchart of download processing.

The details of the processing for downloading the archive file in step S100 will be described with reference to the flowcharts illustrated in FIGS. 10 and 13. In step S1000, the content display unit 312 extracts the GUID from the archive response, generates a download request in which the extracted GUID is set as a parameter, and transmits the generated download request to the document management server PC 10.

In step S1001, the service control unit 304 of the document management server PC 10 receives the service request, and checks a type of the request. In step S1002, if the service control unit 304 of the document management server PC 10 determines that the type of the request is unclear (YES in step S1002), the processing proceeds to step S1003. In step S1003, the service control unit 304 transmits a request error to the client PC 20. On the other hand, in step S1002, if the service control unit 304 determines that the type of the request is a download request (NO in step S1002), the processing proceeds to step S1004. In step S1004, the service control unit 304 carries out the download processing. The details of the download processing will be described below with reference to FIG. 13.

In step S1005, the content display unit 312 of the client PC 20 determines whether the download request has succeeded. At this time, the content display unit 312 determines that the download request has succeeded if the content display unit 312 receives a download response. In this case (YES in step S1005), in step S1006, the content display unit 312 acquires the archive file from the download response and stores the acquired archive file into the client PC 20. On the other hand, the content display unit 312 determines that the download request has failed if the content display unit 312 receives an error response. In this case (NO in step S1005), in step S1007, the content display unit 312 displays an error message.

Next, the details of the download processing in step S1004 will be described with reference to FIG. 13. In step S1300, the download processing unit 307 acquires the GUID from the download request. In step S1301, the download processing unit 307 acquires the archive file associated with the acquired GUID, and transfers the acquired archive file to the service control unit 304. In step S1303, the service control unit 304 sets the archive file 600 as a parameter of response data, and transmits the download response to the client PC 20.

In the following description, a processing flow of a system according to a second exemplary embodiment of the present invention will be described. The second exemplary embodiment allows a user to update a content document by uploading an archive file to the document management server PC 10 again after, for example, editing the archive file downloaded by performing processing similar to the first exemplary embodiment. In the following description, a difference from the first exemplary embodiment will be described with reference to the drawings and the flowcharts.

Figure 14:
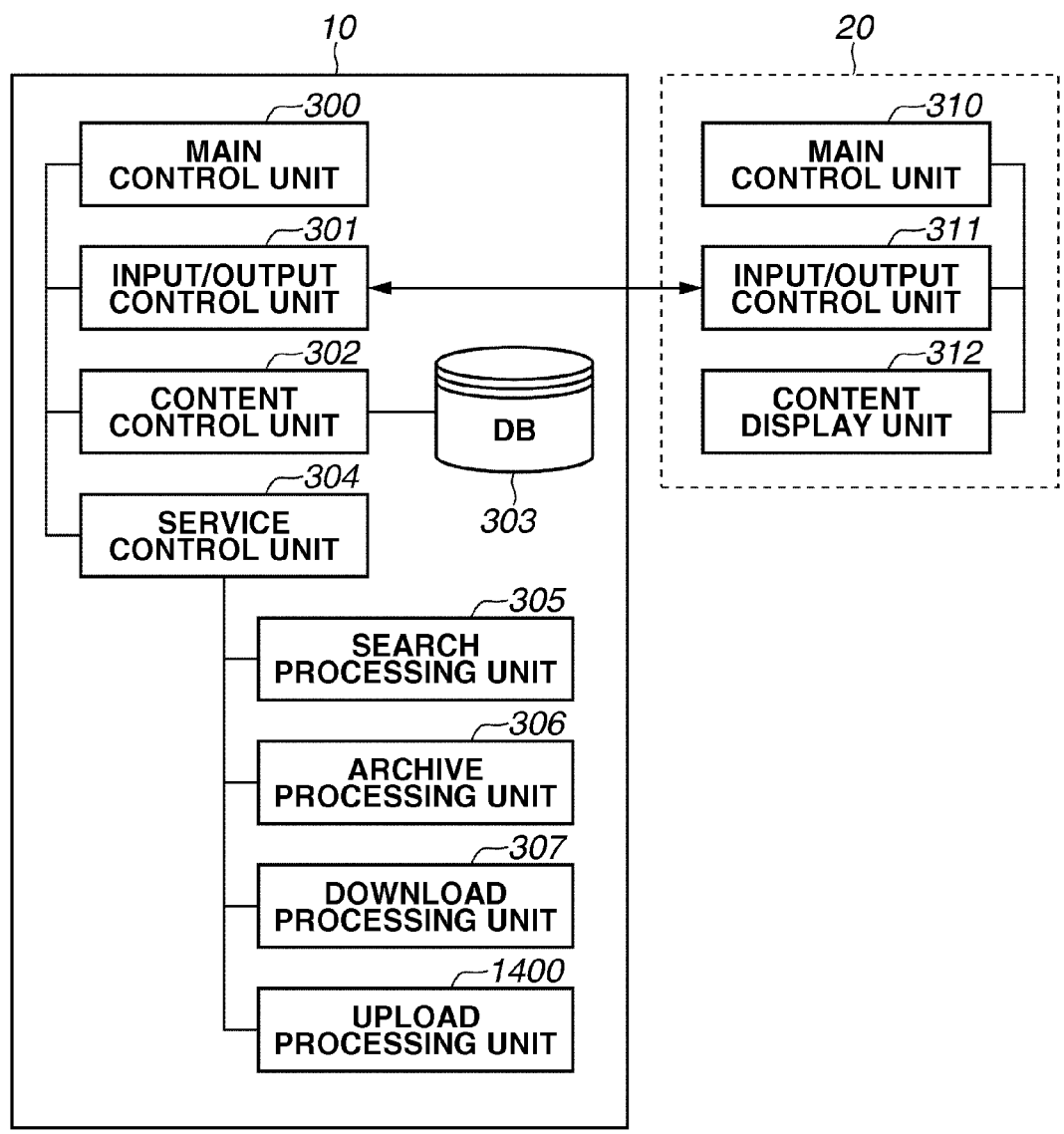
FIG. 14 illustrates an example of a configuration of respective processing units according to a second exemplary embodiment.

FIG. 14 illustrates an example of a configuration of respective processing units provided by the document management server PC 10 and the client PC 20 in a document management system according to the second exemplary embodiment. The second exemplary embodiment is similar to the first exemplary embodiment, except that the second exemplary embodiment additionally includes an upload processing unit 1400.

The service control unit 304 assigns processing to the upload processing unit 1400 according to an upload request received by the input/output management unit 301. The upload processing unit 1400 develops an archive file specified as a parameter in the upload request. Then, the archive processing unit 304 updates content information and registers content document entity data via the content control unit 302 based on information described in an archive information file in the archive file.

Figure 15:
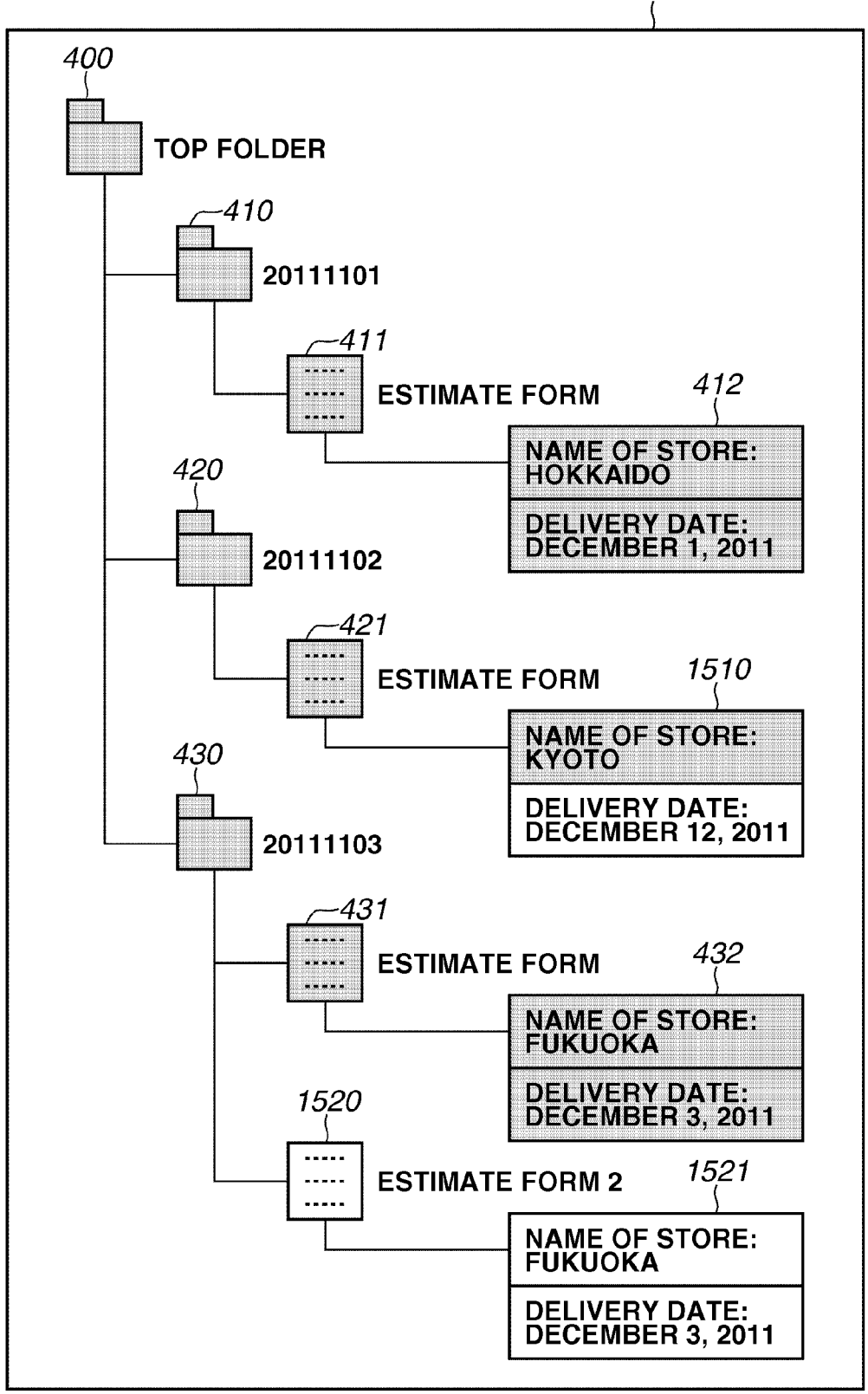
FIG. 15 illustrates an example of a configuration of contents after upload processing.

FIG. 15 illustrates a configuration of content information stored in the DB 303 after the upload processing according to the second exemplary embodiment. A content document that is not updated by the upload processing stays the same as the content document illustrated in FIG. 4 without any change made thereto. In the example illustrated in FIG. 15, after the upload processing, the content document 421 has content document properties 1510 in which the property "DELIVERY DATE" is updated to "December 12, 2011". Further, "ESTIMATE FORM 2" (hereinafter referred to as "the content document 1520"), which is a content document, is newly additionally stored in the folder 430, and content document properties 1521 are associated with the content document 1520.

FIG. 16 illustrates a configuration of a UI according to the second exemplary embodiment of the present invention. This UI is displayed by the content display unit 312. The main screen 500 includes the header display area 501, a tree display area 1600, the search condition area 502, the content display area 503, the property display area 504, and the footer display area 505. A difference from the first exemplary embodiment is that the main screen 500 additionally includes the tree display area 1600, and the other areas of the main screen 500 are similar to the first exemplary embodiment.

Folders under which content documents are managed are hierarchically displayed in the tree display area 1600. In the present second exemplary embodiment, the folder structure illustrated in FIGS. 4 and 15 (the top folder 400, and the folders 410, 420, and 430) is displayed. In the present second exemplary embodiment, dragging and dropping (hereinafter referred to as "D & D") an archive file to the tree display area 1600 (or the content display area 503) triggers a start of upload processing of the archive file. However, the method for starting upload processing is not limited to this D & D method. For example, upload processing may be started when a user selects an upload command from an operation menu and specifies an archive file to be uploaded.

FIG. 17 illustrates an example of a configuration of an archive file to be uploaded. In this example, assume that the archive file becomes structured as illustrated in FIG. 17A after a user downloads the archive file illustrated in FIG. 6A by performing processing similar to the first exemplary embodiment, and then edits the archive file. This edition processing results in update of a value 1731 of the property "DELIVERY DATE" included in property information 1730 of the content document 421 to "DECEMBER 12, 2012". Further, this edition processing results in replacement of the content document 431 illustrated in FIG. 6 with a content document 1710 (ESTIMATE FORM 2) as illustrated in FIG. 17A, although the property information 680 thereof is not edited.

Therefore, the archive file 1700 illustrated in FIG. 17A manages folders 610 and 620 as well as an archive information file 1720. The folder 610 contains entity data of the content document 421, and the folder 620 contains entity data of the content document 1710.

As illustrated in FIG. 17B, information (names, paths, and properties) regarding the content documents (421 and 1710), and paths of these content documents in the archive file 1700 are described in the archive information file 1720 after the edition. In the following description, changes in the tags resulting from the edition will be described. Tags 1730 illustrated in FIG. 17B are defined by a pair of <properties> and </properties>, and manage property information attached to the content document 421. The details of the tags 1730 are illustrated in FIG. 17C. Referring to FIG. 17C, the value described between tags 1731, <value> and </value> is updated to "December 12, 2011" in a property 662 of the content document 421.

Further, since the content document 431 illustrated in FIG. 6 is replaced with the content document 1710 (ESTIMATE FORM 2) as illustrated in FIG. 17A, the document name described between tags 1740, <name> and </name> is changed to "ESTIMATE FORM 2" in the archive information file 1720 illustrated in FIG. 17B. However, as illustrated in FIG. 17D, the property information 680 of the content document 1710 is untouched, and therefore is similar to the property information 680 illustrated in FIG. 6D.

Figure 18:
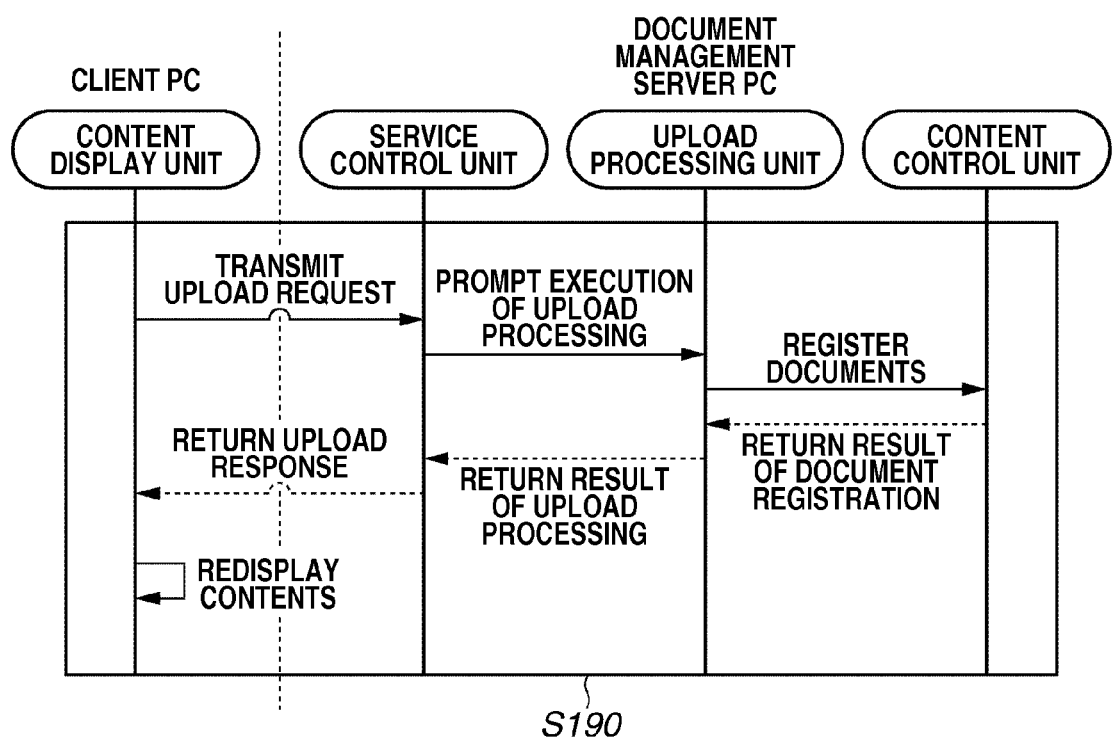
FIG. 18 illustrates a sequence of processing for uploading the archive file.

FIG. 18 is a sequence diagram illustrating a flow of processing (S190) for uploading the archive file 1700 stored in the client PC 20 to the document management server PC 10. The content display unit 312 receives an event issued upon D & D of the archive file 1700 to the tree display area 1600 by a user's operation. Then, the content display unit 312 transmits an upload request in which the archive file 1700 is set as a parameter, to the document management server PC 10. Upon reception of the upload request, the service control unit 304 of the document management server PC 10 instructs the upload processing unit 1400 to perform the upload processing.

The upload processing unit 1400 develops the archive file 1700 included in the archive request, analyzes the archive information file 1720, and transfers the content document entity data and the content information (the names, the paths, and the properties) contained in the archive file 1700 to the content control unit 302. The content control unit 302 registers the content document entity data and the content information in a storage location in the DB 303 that is specified by the path, and returns a result of the registration to the upload processing unit 1400. The upload processing unit 1400 transfers the result of upload processing to the service control unit 304. Upon reception of the result of upload processing, the service control unit 304 transmits an upload response to the content display unit 312 of the client PC 20. The content display unit 312 displays the information of the content documents after the registration processing in the content display area 503 in the form of a list.

The details of the processing for uploading the archive file from the client PC 20 to the document management server PC 10 in step S190 will be described with reference to FIGS. 19 and 20. Referring to FIG. 19, in step S1900, upon detection of D & D of the archive file 1700 to the tree display area 1600, the content display unit 312 generates an upload request in which the archive file 1700 is set as a parameter, and transmits the generated upload request to the document management server PC 10.

In step S1901, the service control unit 304 of the document management server PC 10 receives the service request, and checks a type of the received request. In step S1902, if the service control unit 304 of the document management server PC 10 determines that the type of the request is unclear (YES in step S1902), the processing proceeds to step S1903. In step S1903, the service control unit 304 transmits a request error to the client PC 20. On the other hand, in step S1902, if the service control unit 304 determines that the type of the request is an upload request (NO in step S1902), the processing proceeds to step S1904. In step S1904, the service control unit 304 carries out the upload processing. The details of the upload processing will be described below with reference to FIG. 20.

In step S1905, the content display unit 312 of the client PC 20 determines whether the upload request has succeeded. At this time, the content display unit 312 determines that the upload request has succeeded if the content display unit 312 receives an upload response. In this case (YES in step S1905), in step S1906, the content display unit 312 redisplays the content display area 503. On the other hand, the content display unit 312 determines that the upload request has failed if the content display unit 312 receives an error response. In this case (NO in step s1905), in step S1907, the content display unit 312 displays an error message.

Next, the details of the upload processing in step S1904 will be described with reference to FIG. 20. In step S2000, the upload processing unit 1400 generates a new GUID, and generates a folder with a GUID name. This folder is a working folder that is temporarily used when the archive file is developed. In step S2001, the upload processing unit 1400 extracts all folders, the content document entity data, and the archive information file 1720 from the archive file 1700, and stores them into the folder generated in step S2000. In step S2002, the upload processing unit 1400 analyzes the archive information file 1720 stored in step S2001, and recognizes the content information (the name, the path, and the properties) of each content document.

Step S2003 is a step where a loop starts. The upload processing unit 1400 repeats the processes of steps S2003 to S2008, sequentially processing the content documents extracted from the archive file 1700. In step S2004, the upload processing unit 1400 acquires the content document entity data and the path information stored in step S2001, and instructs the content control unit 302 to register the content.

In step S2005, the content control unit 302 registers the content document entity data in the storage location in the DB 303 that is specified by the path information. Since the path information included in the content information indicates the path where each content document was stored when the archive file 1700 was downloaded, the entity data of each content document after the update processing is registered as an updated content (or registered as a new additional content) in the storage location in the DB 303 where the content document was stored originally. (More specifically, the renamed content document 1710 is registered as a new additional content like the content document 1520 illustrated in FIG. 15 since the content document 1710 has a different name from the content document 431 originally stored in the DB 303. On the other hand, the content document 421 is not renamed, and therefore has the same name as the content document 421 originally stored in the DB 303. Therefore, the content document 421 is registered as an updated content.)

In step S2006, the archive processing unit 1400 acquires the content information (the name and the properties) analyzed in step S2002, and instructs the content control unit 302 to update the content information. In step S2007, the content control unit 302 updates the content document properties regarding the content document registered in step S2005. Step S2008 is a step that makes a pair with step S2003, and a step where the loop ends.

In step S2009, the upload processing unit 1400 deletes the folder with a GUID name, which is generated in step S2000, and transfers a result of upload processing to the service control unit 304. In step S2010, the service control unit 304 transmits an upload response to the client PC 20.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-018415 filed Jan. 31, 2012, which is hereby incorporated by reference herein in its entirety.

What is claimed is:

1. A document management server connected to a client via a network and configured to manage content documents stored in folders having a hierarchical structure, the document management server comprising:
   a receiving unit configured to receive a download request from the client, wherein the received download request includes information specifying a plurality of content documents to be downloaded and flag information indicating whether there are content documents having a same name among the specified plurality of content documents, the flag information being set by the client;
   an entity data storage unit configured to acquire, based on the received download request, entity data of the plurality of content documents specified to be downloaded by the client, and store the acquired entity data of the specified plurality of content documents in different folders generated under a root of an archive file if the flag information indicates that there are content documents having a same name among the specified plurality of content documents, wherein the entity data storage unit stores the acquired entity data of the specified plurality of content documents under a root of an archive file if the flag information indicates that there are not content documents having a same name among the specified plurality of content documents;
   an archive information file storage unit configured to generate an information file in which path information in the document management server and path information in the archive file with respect to each of the plurality of content documents specified to be downloaded are described in association with each other, and store the generated information file in the archive file; and
   a transmission unit configured to transmit the archive file storing the entity data of the specified plurality of content documents and the information file to the client.

2. The document management server according to claim 1, wherein the archive information file storage unit generates the information file in which the path information in the document management server, the path information in the archive file, and property information with respect to each of the plurality of content documents specified to be downloaded are described in association with each other, and stores the generated information file in the archive file.

3. The document management server according to claim 1, further comprising:
   an archive file storage unit configured to store the archive file storing the entity data and the information file of each of the plurality of content documents while associating the archive file with a file identifier for identifying the archive file; and
   an identifier transmission unit configured to transmit the file identifier to the client,
   wherein the transmission unit transmits the archive file stored in association with the file identifier to the client in a case where the download request including the file identifier is received from the client.

4. The document management server according to claim 1, further comprising:
   a search unit configured to search for a content document which meets a search condition transmitted from the client; and
   a search result transmission unit configured to transmit a search result of the search unit to the client,
   wherein the plurality of content documents specified to be downloaded by the client are content documents selected by a user from the search result at the client.

5. The document management server according to claim 1, further comprising an upload unit configured to, in a case where the document management server receives a request for uploading the archive file updated at the client, acquire the path information in the document management server with respect to the entity data of each content document contained in the updated archive file by analyzing the information file contained in the updated archive file, and store the entity data of the content document in a storage location specified by the path information.

6. The document management server according to claim 5, wherein the upload unit further acquires property information of each content document contained in the updated archive file by analyzing the information file contained in the updated archive file, and updates the property information establishing association with the entity data of the content document stored in the storage location specified by the path information with use of the acquired property information.

7. The document management server according to claim 1, wherein the entity data storage unit acquires the entity data of the plurality of content documents specified to be downloaded by the client, and stores the acquired entity data of each of the plurality of content documents in a same folder in the archive file, in a case where there is no content documents having a same name among the specified plurality of content documents.

8. A document management method to be performed by a document management server connected to a client via a network and configured to manage content documents stored in folders having a hierarchical structure, the document management method comprising:
   a receiving step of receiving a download request from the client, wherein the received download request includes information specifying a plurality of content documents to be downloaded and flag information indicating whether there are content documents having a same name among the specified plurality of content documents, the flag information being set by the client;

an acquiring step of acquiring, based on the received download request, entity data of the plurality of content documents specified to be downloaded by the client;

a storing step of storing the acquired entity data of the specified plurality of content documents in different folders generated under a root of an archive file if the flag information indicates that there are content documents having a same name among the specified plurality of content documents, wherein the storing step stores the acquired entity data of the specified plurality of content documents under a root of an archive file if the flag information indicates that there are not content documents having a same name among the specified plurality of content documents;

an information file storing step of generating an information file in which path information in the document management server and path information in the archive file with respect to each of the plurality of content documents specified to be downloaded are described in association with each other, and storing the generated information file into the archive file; and a transmission step of transmitting the archive file storing the entity data of each of the plurality of content documents and the information file to the client.

9. A non-transitory computer readable storage medium storing a computer program for causing a computer to function as:

a receiving unit configured to receive a download request from the client, wherein the received download request includes information specifying a plurality of content documents to be downloaded and flag information indicating whether there are content documents having a same name among the specified plurality of content documents, the flag information being set by the client;

an entity data storage unit configured to acquire, based on the received download request, entity data of the plurality of content documents specified to be downloaded by the client, and store the acquired entity data of the specified plurality of content documents in different folders generated under a root of an archive file if the flag information indicates that there are content documents having a same name among the specified plurality of content documents, wherein the entity data storage unit stores the acquired entity data specified plurality of content documents under a root of an archive file if the flag information indicates that there are not content documents having a same name among the specified plurality of content documents;

an archive information file storage unit configured to generate an information file in which path information in the document management server and path information in the archive file with respect to each of the plurality of content documents specified to be downloaded are described in association with each other, and store the generated information file in the archive file; and a transmission unit configured to transmit the archive file storing the entity data of the specified plurality of content documents and the information file to the client.

* * * * *